United States Patent
Mongoin et al.

(10) Patent No.: US 8,221,587 B2
(45) Date of Patent: Jul. 17, 2012

(54) USE OF AN AQUEOUS SUSPENSION AND/OR DISPERSION OF MINERAL MATERIALS CONTAINING A HYDROPHOBIC GROUP WATER-SOLUBLE COPOLYMER FOR MAKING A PAPER SHEET

(75) Inventors: Jacques Mongoin, Quincieux (FR); Francois Dupont, Lyons (FR); Hubert Parant, Bourron-Marlotte (FR); Jean-Marc Suau, Lucenay (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 12/444,591

(22) PCT Filed: Oct. 3, 2007

(86) PCT No.: PCT/UB2007/002997
§ 371 (c)(1),
(2), (4) Date: May 20, 2009

(87) PCT Pub. No.: WO2008/044118
PCT Pub. Date: Apr. 17, 2008

(65) Prior Publication Data
US 2010/0038046 A1    Feb. 18, 2010

(30) Foreign Application Priority Data

Oct. 12, 2006 (FR) ..................................... 06 08927

(51) Int. Cl.
*D21F 11/00* (2006.01)

(52) U.S. Cl. .................................. 162/157.1; 162/164.4
(58) Field of Classification Search ............... 162/157.1, 162/164.4, 164.5, 164.6, 168.1; 524/507, 524/413, 425
See application file for complete search history.

(56) References Cited

U.S. PATENT DOCUMENTS

| 6,057,398 A | 5/2000 | Blum |
| 6,093,764 A | 7/2000 | Egraz et al. |

FOREIGN PATENT DOCUMENTS

| EP | 0 892 020 | 1/1999 |
| EP | 0 892 111 | 1/1999 |

OTHER PUBLICATIONS

U.S. Appl. No. 12/744,688, filed May 26, 2010, Dupont, et al.
U.S. Appl. No. 12/446,244, filed Apr. 20, 2009, Guerret, et al.

*Primary Examiner* — Mark Halpern
(74) *Attorney, Agent, or Firm* — Oblon, Spivak, McClelland, Maier & Neustadt, L.L.P.

(57) ABSTRACT

The invention consists in the use, in a method for manufacturing a sheet of paper, of an aqueous suspension and/or dispersion of mineral materials as an agent for slowing the penetration of the paper coating into said sheet, characterized in that said suspension and/or dispersion contains at least one water-soluble copolymer made up of at least one ethylenically-unsaturated anionic monomer, and at least one ethylenically-unsaturated oxylalkylated monomer terminated by a hydrophobic chain.
It also consists in a method for manufacturing a sheet of paper which implements said copolymer, as well as the sheet of paper obtained.

14 Claims, 1 Drawing Sheet

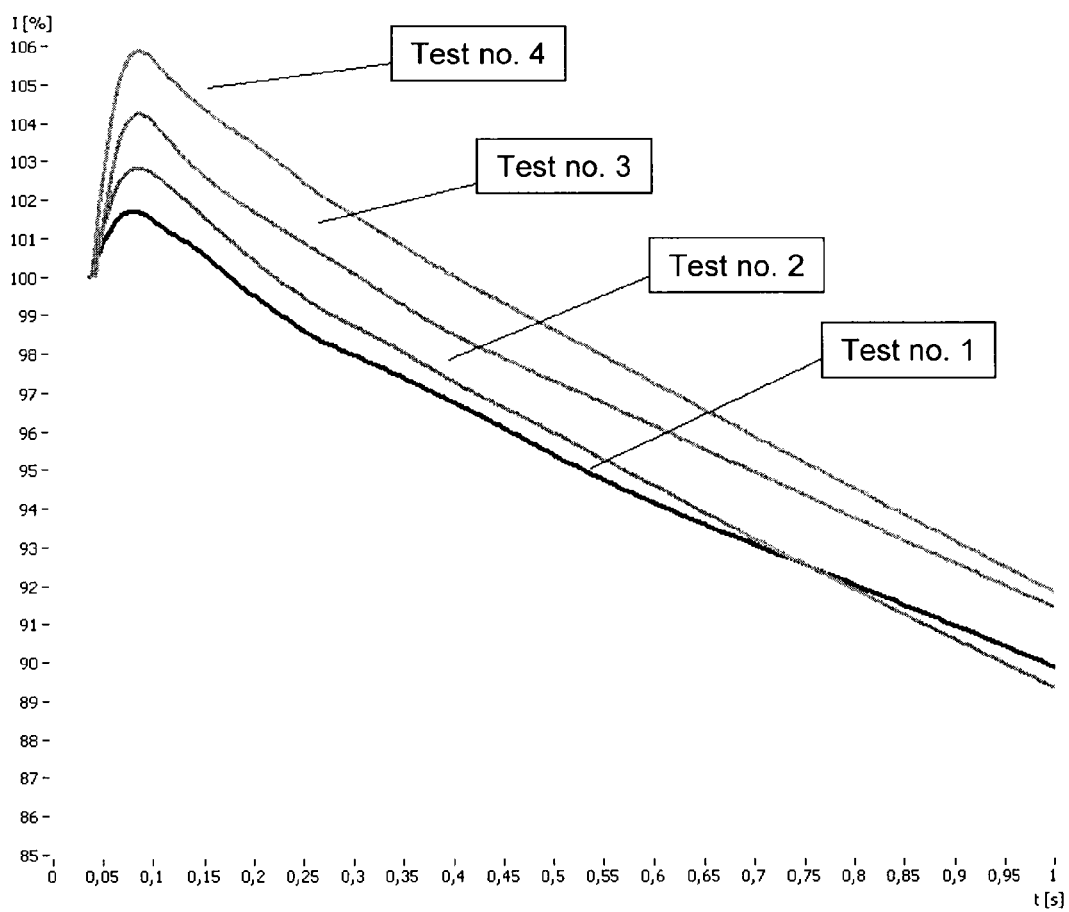

USE OF AN AQUEOUS SUSPENSION AND/OR DISPERSION OF MINERAL MATERIALS CONTAINING A HYDROPHOBIC GROUP WATER-SOLUBLE COPOLYMER FOR MAKING A PAPER SHEET

This application is a 371 of PCT/IB07/02997 filed on 3 Oct. 2007.

BACKGROUND OF THE INVENTION

The present invention pertains to the technical field of aqueous suspensions of mineral materials involved in manufacturing sheets of paper.

When manufacturing a coated sheet of paper, a first step consists in converting the papermaking pulp, by means of the papermaking machine, into a sheet of paper, which is not yet coated. The papermaking pulp essentially contains natural cellulose fibers or synthetic fibers, water, and one or more mineral materials such as calcium carbonate, as well as various other additives such as so-called "pasting" agents. A mineral material (such as calcium carbonate) used in such situations is referred to as a "filler". The second step resides in coating the previously obtained sheet. This operation consists in applying to the base paper medium an aqueous compound known as a "paper coating", which particularly contains water, one or more mineral materials such as calcium carbonate, one or more binders, and various additives. When manufacturing a paper coating, a mineral material (such as calcium carbonate) that is used is referred to as a coating pigment.

After being applied to the medium, the paper coating has a natural tendency to transfer some or all of the water-soluble or suspended substances that it contains into the medium. The slowing down of this migration into the paper medium is necessary in order to maintain a homogeneous distribution of water-soluble or suspended substances within the thickness of the paper coating thereby applied, which ultimately improves the paper's surface condition and printability.

In seeking to resolve the particular technical problem of slowing the penetration of a paper coating into a sheet of paper, though without preventing it from occurring, with the goal being to maintain a homogeneous distribution of water-soluble or suspended substances within the thickness of the paper coating thereby applied, persons skilled in the art have identified two possible technologies:

the first one consists of modifying the rheology of the paper coating by adding to it rheology-modifying agents known as "thickening agents", which, by increasing the paper coating's viscosity, reduce its penetration into the sheet of paper. The paper coating's "water retention" is referred to in such cases. The problem with this technology is that any significant change to the paper coating's rheology may have negative effects on the process's other parameters (such as pumping, filtering, and spreading the paper coating), the second one consists of modifying the paper medium's absorbent properties, either by reducing its porosity or by increasing its degree of hydrophobicity.

There are a number of documents dealing with the problem of maximizing a sheet of paper's hydrophobicity with respect to water (as may be desired for paper which must withstand particularly high humidity conditions) or with respect to ink (as may notably be sought for paper intended to be printed with water-based, and particularly acidic, inks). These documents therefore focus on the penetration of liquids such as water or inks whose formula differs from that of a paper coating. Additionally, they generally rely on extremely simple tests, which involve measuring the time it takes for water or an ink to pass through a sheet of paper. Such tests would be wholly unsuitable at highlighting the technical problem covered by the present application:

firstly, in these tests, the liquid (water or ink) passes through the sheet of paper completely, which is not the case for a paper coating that only partially penetrates the paper medium at the time it is applied thereto;

secondly, these tests do not make it possible to dynamically determine the penetrating speed of the paper coating into the sheet of paper during the first tenths of a second following said paper coating's coming into contact with the paper medium.

As explained above, only the technology implemented in the tests given herein can provide an understanding of the phenomena described hereinabove.

Consequently, the documents dealing with the problem of maximizing the hydrophobicity of a sheet of paper with respect to water or ink therefore solve very different problems than the one which forms the object of the present application. If the Applicant mentions these documents anyway, this is done merely to demonstrate that the person skilled in the art, even if he had chosen to refer to said documents (which no objective elements could lead him to consider, because said documents do not treat the technical problem that he wishes to solve), would have found no information disclosing or suggesting the technical solution which is the object of the present application.

Thus, in order to increase the hydrophobicity of a sheet of paper with respect to water or ink, the person skilled in the art is familiar with several solutions, which may be divided into three categories during their use in manufacturing a sheet of paper:

a particular additive, with properties that limit water penetration into said sheet, pasting agents that grant the paper medium's cellulose fibers, which are naturally hydrophilic, hydrophobic properties that improve their resistance to water, mineral materials such as calcium carbonate, said materials being treated, dispersed, or mixed with a particular organic polymer, said materials thereby treated, dispersed or mixed with said polymer granting the sheet of paper water-penetration resistance properties.

In the first category, the person skilled in the art is familiar with the document JP 06-219038, which describes a paper containing pulp, a mineral material such as calcium carbonate, and a "penetration-inhibiting" agent that inhibits the penetration of ink and therefore of water-soluble substance. Such an agent is particularly chosen from among hydrophilic resins such as casein and starch, as well as from among copolymers which have both a hydrophilic part and a hydrophobic part, such as copolymers of maleic anhydride and styrene.

In this category, he is also familiar with the document SU 1,263,739, which describes the usage of an agent that makes the sheet of paper hydrophobic, such as a wax, in combination with a mineral material suspension (such as calcium carbonate) and papermaking pulp, in a method for manufacturing a sheet of paper.

The second category is made up of solutions which use pasting agents that are hydrophobic in nature.

As stated in document WO 96/23105, conventional pasting agents of the type which are resins with aluminum sulfates, or those which are based on ketene dimers, exhibit hydrophobic properties which will limit the penetration of water and water-soluble substances into the paper within which said pasting agents are used. This document even discloses the combination of using these pasting agents with a colloidal polymer, for the purposes of improving the hydrophobicity of the sheet of paper Finally, the third category of solutions relies upon the implementation of a mineral material such as calcium carbonate, said material being treated or mixed with an organic polymer.

In this category, the person skilled in the art is familiar with the document U.S. Pat. No. 5,514,212, which describes the treatment of the surface of a calcium carbonate through precipitation in the presence of a compound of starch and fatty acids having 16 to 18 carbon atoms. A calcium carbonate modified in this manner is used as an aqueous suspension in manufacturing a sheet of paper. This document indicates that the quantity of pasting agents used in manufacturing a sheet of paper may thereby be reduced. It also mentions that the sheet of paper's degree of hydrophobicity is thereby improved. This level of hydrophobicity is determined using acidic water-based ink penetration measurements: this is a test well known to the person skilled in the art as a "Hercules Sizing Test" or "HST", consisting of determining the time needed for a standardized water-based ink containing formic acid to pass through a sheet of paper. The objective of this test is therefore to determine a paper's resistance to water-based, acidic inks which are intended to be printed upon said paper afterwards. Additionally, the examples given in this document only pertain to uncoated sheets of paper. Consequently, there is no information in document U.S. Pat. No. 5,514,212 that reveals or suggests that the use of calcium carbonates treated using the method described therein slows the penetration of a paper coating into the sheet of paper and leads to an even distribution of water-soluble or suspended substances throughout the thickness of the paper coating applied to the paper.

The person skilled in the art is also familiar with the document WO 01/86067, which describes a method for treating a mineral material such as calcium carbonate using an acrylate-, acrylonitrile- and styrene-based hydrophobic polymer, polymerized in the presence of starch, polysaccharide, or carboxymethylcellulose. Said polymer is mixed with said mineral material in the form of an aqueous solution or suspension, with this solution or suspension later being used in the manufacturing of a sheet of paper, whose degree of hydrophobicity is thereby improved. As with the previous document, the examples do not pertain to coated sheets of paper. Furthermore, these examples consist of rudimentary HST tests.

Finally, the person skilled in the art is also familiar with the document WO 00/03093, which describes a method for manufacturing a sheet of paper, using a mineral material such as calcium carbonate, in the form of an aqueous suspension further containing a copolymer combining acrylonitrile with another monomer such as styrene, with this copolymer giving the calcium carbonate a hydrophobic function. In this document, it is indicated that the calcium carbonate and the copolymer are mixed in the water. The calcium carbonate thereby used in manufacturing the sheet of paper grants said sheet improved hydrophobicity. As with the two previous documents, the examples consist of simple ink-penetration measurements using the HST test. Additionally, the sheets of paper are uncoated.

Consequently, none of these documents reveals or suggests using, in a method for manufacturing a sheet of paper, an aqueous suspension or dispersion of mineral materials as an agent for slowing the penetration of a paper coating into said sheet, said dispersion and/or suspension characterized in that it contains at least one water-soluble copolymer made up of:
a) at least one ethylenically-unsaturated anionic monomer,
b) at least one ethylenically-unsaturated oxylalkylated monomer, terminating in a hydrophobic chain.

One of the Applicant's innovations particularly relies on the fact that she has noted that mineral materials,
both in an aqueous suspension and/or dispersion,
and in association with a particular copolymer,
are particularly suitable for solving the technical problem covered by the present application.

Without wishing to bound to any theory whatsoever, the Applicant thinks that the mineral material, particularly when it is ground and/or dispersed with said copolymer, then when it is used in manufacturing the sheet of paper, will develop properties of slowing the penetration of a paper coating into said sheet: this property is particularly illustrated in the tests herein, using an original technique of tracking the penetration of the paper coating into the sheet by means of ultrasound, during the first tenths of a second after the paper coating has come into contact with the paper medium. It is thereby demonstrated that, entirely advantageously, the present invention leads to the slowing of the penetration of the paper coating into the sheet of paper, which results in an even distribution of water-soluble or suspended substances throughout the thickness of the paper coating applied to the paper.

The Applicant wishes to indicate that she is, however, familiar with a number of documents dealing with aqueous suspensions of mineral materials which are treated, dispersed, or ground, particularly with water-soluble polymers comprising a hydrophobic group, and used as fillers, i.e. in the manufacturing of a sheet of paper. By indicating such documents, she intends to emphasize that they do not in any way pertain to the technical problem covered herein; to that end, the person skilled in the art cannot find therein any objective instruction that would lead him to the technical solution which is the object hereof.

Thus, with respect to mineral materials used as fillers, said materials being treated, the person skilled in the art is familiar with the document JP 2003-166195. This document describes the treatment of a mineral material used in an aqueous suspension in manufacturing paper, using an organic compound mixed with said mineral material. This organic compound has both a hydrophilic portion and a hydrophobic portion, said hydrophobic portion being made up of an alkyl or alkenyl group having 6 to 24 carbon atoms. The use of an aqueous suspension of mineral materials thereby treated in the manufacturing of paper leads to an increase in the sheet of paper's thickness, which is a very different problem from the one solved by the present invention.

With respect to mineral materials dispersed in an aqueous medium and used as fillers, the person skilled in the art is familiar with the document U.S. Pat. No. 4,801,354. This document describes the use, as a mineral material dispersing agent, of a copolymer having a "Fikentscher K value" from 10 to 65 and made up of a (meth)acrylic ester and an ethylenically-unsaturated carboxylic acid, preferentially isobutylacrylate, whose water solubility is very low (0.2 g in 100 g of water). The aqueous suspensions of mineral materials thereby dispersed (such as calcium carbonate) are used in manufacturing the sheet of paper, where they make it possible to limit the quantity of mineral load retaining agents, which the present invention does not seek to solve.

Finally, with respect to mineral materials dispersed or ground in an aqueous medium, the person skilled in the art is familiar with the document EP 0,892,020. This document describes the use of a copolymer as a dispersing agent and/or grinding aid agent for mineral materials in an aqueous suspension, characterized in that said copolymer is a copolymer with a specific viscosity no greater than 50 and made up of at least one ethylenically-unsaturated monomer with a carboxylic function and at least one ethylenically-unsaturated oxylalkylated monomer terminating in a hydrophobic chain.

The technical problem solved by this document is the search for a polymer that may be used as both a mineral material dispersing and/or grinding agent, no matter whether such materials are hydrophilic, such as calcium carbonate, or hydrophobic, such as talc. Although document EP 0,892,020 indicates that the mineral materials thereby obtained may be used as fillers, there are no examples concerning such usage. Moreover, there is no information in that document revealing or suggesting the use of mineral materials ground in an aqueous suspension and used as fillers with the particular function of slowing the penetration of a paper coating into the sheet of paper.

BRIEF SUMMARY OF THE INVENTION

Thus, a first object of the invention is the use, in a method for manufacturing a sheet of paper, of an aqueous dispersion and/or suspension of mineral materials as an agent for slowing the penetration of the paper coating into said sheet, characterized in that said dispersion and/or suspension contains at least one water-soluble copolymer made up of:
  a) at least one ethylenically-unsaturated anionic monomer,
  b) at least one ethylenically-unsaturated oxylalkylated monomer, terminating in a hydrophobic chain.

This use is further characterized in that said water-soluble copolymer is used during at least one step of grinding and/or dispersing said mineral materials in an aqueous medium.

Naturally, the person skilled in the art may use, in combination with said copolymer, another agent with which he is familiar for grinding and/or dispersing mineral materials.

This use is further characterized in that said water-soluble copolymer is made up of:
  a) at least one ethylenically-unsaturated anionic monomer which is an ethylenically-unsaturated anionic monomer in an acid or salt form, chosen from among ethylenically-unsaturated anionic monomers with a monocarboxylic function in their acid or salt form, and preferentially from among acrylic, methacrylic, crotonic, isocrotonic, or cinnamic acid, or diacid hemiesters such as $C_1$-$C_4$ monoesters of maleic or itaconic acides; or chosen from among ethylenically-unsaturated monomers with a dicarboxylic function in their acid or salt form, and preferentially from among itaconic, maleic, fumaric, mesaconic, or citraconic acid, or carboxylic acid anhydrides, such as maleic anhydride; or chosen from among ethylenically-unsaturated monomers with a sulfonic function in their acid or salt form, and preferentially from among acrylamido-2-methyl-2-propanesulfonic acid, sodium methallylsulfonate, sulfonic vinyl acid, and sulfonic styrene acid; or chosen from among ethylenically-unsaturated monomers with a phosphoric function in their acid or salt form, and preferentially from among phosphoric vinyl acid, ethylene glycol methacrylate phosphate, propylene glycol methacrylate phosphate, ethylene glycol acrylate phosphate, propylene glycol acrylate phosphate and their ethoxylates; or from among ethylenically-unsaturated monomers with a phosphonic function in their acid or salt form, and is preferentially phosphonic vinyl acid; or mixtures thereof,
  b) at least one ethylenically-unsaturated oxyalkylated monomer terminated by a hydrophobic chain, whose general formula (I) is:

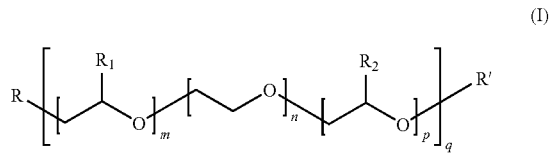

wherein:
  m and p represent a number of alkylene oxide units less than or equal to 100, n represents a number of ethylene oxide units less than or equal to 100, and q is a number at least equal to 1, with $0 \leq q(n+m+p) \leq 100$,
  $R_1$ represents hydrogen or the methyl or ethyl radical,
  $R_2$ represents hydrogen or the methyl or ethyl radical,
  R represents the polymerizable unsaturated radical belonging to the group of acrylic, methacrylic, maleic, itaconic, crotonic, and vinylphtalic esters, as well as unsaturated urethanes such as, for example, acrylurethanes, methacrylurethanes, α-α' dimethyl-m-isopropenyl-benzylurethannes, and allylurethane,
  R' represents a hydrophobic radical.

This use is further characterized in that the radical R' is chosen from among the radical tristyrylphenyl or from among dialkylamines with at least 8 carbon atoms, or from among linear or branched alkyl, alkylaryl, arylalkyl, and aryl groups with at least 8 carbon atoms, preferentially 10 to 24 carbon atoms, very preferentially from 16 to 20 carbon atoms each with two branches having at least six carbon atoms, or mixtures of these radicals, and in that the radical R' is extremely preferentially chosen from among 2-hexyl 1-decanyl and 2-octyl 1-dodecanyl or mixtures thereof.

BRIEF DESCRIPTION OF THE DRAWINGS

FIG. 1 shows the intensity-over-time curves for test no. 1 to 4.

DETAILED DESCRIPTION OF THE INVENTION

When choosing the copolymer described above, the present invention is not limited solely to the presence of the two monomers a) and b), although these two monomers remain essential to the composition of said copolymer. To that end, the present application is further characterized in that in addition to at least one a) monomer and at least one b) monomer, said copolymer further contains at least one other monomer, chosen from among an acrylamide or methacrylamide monomer or derivatives thereof, such as N-[3-(dimethylamino)propyl]acrylamide or N-[3-(dimethylamino)propyl] methacrylamide, and mixtures thereof; or from among a non-water-soluble monomer such as alkyl acrylates or methacrylates, unsaturated esters such as N-[2-(dimethylamino)ethyl]methacrylate, or N-[2-(dimethylamino)ethyl] acrylate, vinylics such as vinyl acetate, vinylpyrrolidone, styrene, alphamethylstyrene and derivatives thereof; or from among a cationic or quaternary ammonium monomer such as, preferentially, [2-(methacryloyloxy)ethyl]trimethyl ammonium sulfate or chloride, [2-(acryloyloxy)ethyl]trimethyl ammonium sulfate or chloride, [3-(acrylamido)propyl]trimethyl ammonium sulfate or chloride, dimethyl diallyl ammonium sulfate or chloride, [3-(methacrylamido)propyl]trimethyl ammonium sulfate or chloride; or from among an organofluorated or organosililated monomer, or from among those cross-linking monomers (i.e. monomers with at least two ethylene unsaturations) that are well known to the person skilled in the art, or mixtures of these monomers.

The present application is further characterized in that said water-soluble copolymer is made up of each of the following components, expressed as a percentage by weight:
a) 5% to 95%, preferentially 50% to 95%, and very preferentially 70% to 95% of at least one ethylenically-unsaturated anionic monomer which is an ethylenically-unsaturated anionic monomer in an acid or salt form, chosen from among ethylenically-unsaturated anionic monomers with a monocarboxylic function in their acid or salt form, and preferentially from among acrylic, methacrylic, crotonic, isocrotonic, or cinnamic acid, or diacid hemiesters such as $C_1$-$C_4$ monoesters of maleic or itaconic acides; or chosen from among ethylenically-unsaturated monomers with a dicarboxylic function in their acid or salt form, and preferentially from among itaconic, maleic, fumaric, mesaconic, or citraconic acid, or carboxylic acid anhydrides, such as maleic anhydride; or chosen from among ethylenically-unsaturated monomers with a sulfonic function in their acid or salt form, and preferentially from among acrylamido-2-methyl-2-propane-sulfonic acid, sodium methallylsulfonate, sulfonic vinyl acid, and sulfonic styrene acid; or chosen from among ethylenically-unsaturated monomers with a phosphoric function in their acid or salt form, and preferentially from among phosphoric vinyl acid, ethylene glycol methacrylate phosphate, propylene glycol methacrylate phosphate, ethylene glycol acrylate phosphate, propylene glycol acrylate phosphate and their ethoxylates; or from among ethylenically-unsaturated monomers with a phosphonic function in their acid or salt form, and is preferentially phosphonic vinyl acid; or mixtures thereof,
b) 5% to 95%, preferentially 5% to 50%, and very preferentially 5% to 30% of at least one ethylenically-unsaturated oxyalkylated monomer terminated by a hydrophobic chain, whose general formula (I) is:

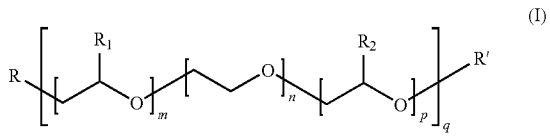

wherein:
m and p represent a number of alkylene oxide units less than or equal to 100, n represents a number of ethylene oxide units less than or equal to 100, and q is a number at least equal to 1, with $0 \leq q(n+m+p) \leq 100$,
$R_1$ represents hydrogen or the methyl or ethyl radical,
$R_2$ represents hydrogen or the methyl or ethyl radical,
R represents the polymerizable unsaturated radical belonging to the group of acrylic, methacrylic, maleic, itaconic, crotonic, and vinylphtalic esters, as well as unsaturated urethanes such as, for example, acrylurethanes, methacrylurethanes, α-α' dimethyl-m-isopropenyl-benzylurethannes, and allylurethane,
R' represents a hydrophobic radical, chosen from among the radical tristyrylphenyl or from among dialkylamines with at least 8 carbon atoms, or from among linear or branched alkyl, alkylaryl, arylalkyl, and aryl groups with at least 8 carbon atoms, preferentially 10 to 24 carbon atoms, and very preferentially from 16 to 20 carbon atoms each with two branches having at least six carbon atoms, or mixtures of these radicals, R' being extremely preferentially chosen from among 2-hexyl 1-decanyl and 2-octyl 1-dodecanyl or mixtures thereof.

This use is further characterized in that said water-soluble copolymer is obtained by radical polymerization methods in a solution, in a direct or inverse emulsion, in a suspension or precipitation in solvents, in the presence of catalytic systems and transfer agents, or by controlled radical polymerization methods, and preferentially by nitroxide-mediated polymerization (NMP) or cobaloxyme-mediated polymerization, by atom transfer radical polymerization (ATRP), by sulfur-derivative controlled radical polymerization, said sulfur derivatives being chosen from among carbamates, dithioesters, trithiocarbonates (RAFT), or xanthates.

This use is further characterized in that said water-soluble copolymer, obtained in an acidic and potentially distilled form, may also be fully or partially neutralized by one or more neutralization agents having a monovalent or polyvalent function, chosen from the group made up of alkaline cations, and preferentially from among sodium, potassium, or ammonium, or chosen from among the group made up of primary, secondary, or tertiary aliphatic and/or cyclical amines, and preferentially from among stearylamine, ethanolamines (mono-, di-, and triethanolamine), mono- and diethylamine, cyclohexylamine, and methylcyclohexylamine; or chosen from the group made up of divalent alkaline-earth cations, and preferentially from among magnesia, calcium, and zinc; or chosen from the group made up by trivalent cations, and preferentially aluminum.

Each neutralization agent then becomes involved in accordance with neutralization rates specific to each valence function.

In another variant, the copolymer resulting from the copolymerization reaction may potentially, before or after the total or partial neutralization, be treated and separated into multiple phases, in accordance with static or dynamic methods known to the person skilled in the art, by one or more polar solvents preferentially belonging to the group made up of water, methanol, ethanol, propanol, isopropanol, butanols, acetone, tetrahydrofurane, or mixtures thereof.

One of the phases corresponds to the copolymer used in accordance with the invention as a grinding aid agent for mineral materials in an aqueous suspension.

This use is further characterized in that it uses a quantity of said water-soluble copolymer from 0.1% to 3%, preferentially from 0.2% to 1.5%, and very preferentially 0.3% to 1% by dry weight compared with the total dry weight of the mineral materials.

This use is also characterized in that the dispersion and/or aqueous suspension of mineral materials contains at least 10%, preferentially at least 20%, very preferentially at least 50% and extremely preferentially at least 70% by dry weight of mineral materials, compared with its total weight.

This use is finally characterized in that said mineral materials are chosen from natural or synthetic calcium carbonate, dolomites, limestone, kaolin, talc, gypsum, lime, magnesia, titanium dioxide, satin white, aluminum trioxide or aluminum trihydroxide, silicas, mica and the mixture of these charges, such as mixtures of talc-calcium carbonate, calcium carbonate-kaolin, or mixtures of calcium carbonate with aluminum trihydroxide or aluminum trioxide, or mixtures with synthetic or natural fibers, or co-structures of minerals such as talc-calcium carbonate or talc-titanium dioxide co-structures, or mixtures thereof, and in that said mineral materials are preferably chosen from natural or synthetic calcium carbonate or talc or mixtures thereof, and in that they are very preferably chosen from natural or synthetic calcium carbonate or mixtures thereof.

Another object of the present invention is a method for manufacturing a sheet of paper from a papermaking pulp, characterized in that said pulp is derived from a step of mixing natural and/or synthetic fibers, water, and an aqueous suspension and/or dispersion of mineral materials containing a water-soluble copolymer made up of:

- a) at least one ethylenically-unsaturated anionic monomer which is an ethylenically-unsaturated anionic monomer in an acid or salt form, chosen from among ethylenically-unsaturated anionic monomers with a monocarboxylic function in their acid or salt form, and preferentially from among acrylic, methacrylic, crotonic, isocrotonic, or cinnamic acid, or diacid hemiesters such as $C_1$-$C_4$ monoesters of maleic or itaconic acides; or chosen from among ethylenically-unsaturated monomers with a dicarboxylic function in their acid or salt form, and preferentially from among itaconic, maleic, fumaric, mesaconic, or citraconic acid, or carboxylic acid anhydrides, such as maleic anhydride; or chosen from among ethylenically-unsaturated monomers with a sulfonic function in their acid or salt form, and preferentially from among acrylamido-2-methyl-2-propane-sulfonic acid, sodium methallylsulfonate, sulfonic vinyl acid, and sulfonic styrene acid; or chosen from among ethylenically-unsaturated monomers with a phosphoric function in their acid or salt form, and preferentially from among phosphoric vinyl acid, ethylene glycol methacrylate phosphate, propylene glycol methacrylate phosphate, ethylene glycol acrylate phosphate, propylene glycol acrylate phosphate and their ethoxylates; or from among ethylenically-unsaturated monomers with a phosphonic function in their acid or salt form, and is preferentially phosphonic vinyl acid; or mixtures thereof,
- b) at least one ethylenically-unsaturated oxyalkylated monomer terminated by a hydrophobic chain, whose general formula (I) is:

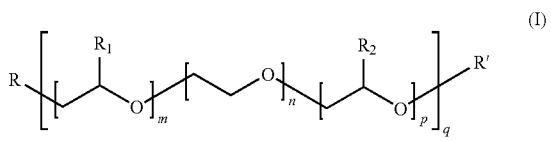

wherein:
  m and p represent a number of alkylene oxide units less than or equal to 100, n represents a number of ethylene oxide units less than or equal to 100, and q is a number at least equal to 1, with $0 \leq q(n+m+p) \leq 100$,
  $R_1$ represents hydrogen or the methyl or ethyl radical,
  $R_2$ represents hydrogen or the methyl or ethyl radical,
  R represents the polymerizable unsaturated radical belonging to the group of acrylic, methacrylic, maleic, itaconic, crotonic, and vinylphtalic esters, as well as unsaturated urethanes such as, for example, acrylurethanes, methacrylurethanes, α-α' dimethyl-m-isopropenyl-benzylurethannes, and allylurethane,
  R' represents a hydrophobic radical, chosen from among the radical tristyrylphenyl or from among dialkylamines with at least 8 carbon atoms, or from among linear or branched alkyl, alkylaryl, arylalkyl, and aryl groups with at least 8 carbon atoms, preferably 10 to 24 carbon atoms, and very preferentially from 16 to 20 carbon atoms each with two branches having at least six carbon atoms, or mixtures of these radicals, R' being extremely preferentially chosen from among 2-hexyl 1-decanyl and 2-octyl 1-dodecanyl or mixtures thereof.

Naturally, the person skilled in the art may use other additives with which he is familiar, and which are generally involved in manufacturing a sheet of paper, in this method.

This method is further characterized in that in addition to at least one a) monomer and at least one b) monomer, said copolymer further contains at least one other monomer, chosen from among an acrylamide or methacrylamide monomer or derivatives thereof, such as N-[3-(dimethylamino)propyl] acrylamide or N-[3-(dimethylamino)propyl]methacrylamide, and mixtures thereof; or from among a non-water-soluble monomer such as alkyl acrylates or methacrylates, unsaturated esters such as N-[2-(dimethylamino)ethyl]methacrylate, or N-[2-(dimethylamino)ethyl]acrylate, vinylics such as vinyl acetate, vinylpyrrolidone, styrene, alphamethylstyrene and derivatives thereof; or from among a cationic or quaternary ammonium monomer such as, preferentially, [2-(methacryloyloxy)ethyl]trimethyl ammonium sulfate or chloride, [2-(acryloyloxy)ethyl]trimethyl ammonium sulfate or chloride, [3-(acrylamido)propyl]trimethyl ammonium sulfate or chloride, dimethyl diallyl ammonium sulfate or chloride, [3-(methacrylamido)propyl]trimethyl ammonium sulfate or chloride; or from among an organofluorated or organosililated monomer, or from among those cross-linking monomers (i.e. monomers with at least two ethylene unsaturations) that are well known to the person skilled in the art, or mixtures of these monomers.

This method is further characterized in that said water-soluble copolymer is made up of the following components, each expressed as a percentage by weight:

- a) 5% to 95%, preferentially 50% to 95%, and very preferentially 70% to 95% of at least one ethylenically-unsaturated anionic monomer which is an ethylenically-unsaturated anionic monomer in an acid or salt form, chosen from among ethylenically-unsaturated anionic monomers with a monocarboxylic function in their acid or salt form, and preferentially from among acrylic, methacrylic, crotonic, isocrotonic, or cinnamic acid, or diacid hemiesters such as $C_1$-$C_4$ monoesters of maleic or itaconic acides; or chosen from among ethylenically-unsaturated monomers with a dicarboxylic function in their acid or salt form, and preferentially from among itaconic, maleic, fumaric, mesaconic, or citraconic acid, or carboxylic acid anhydrides, such as maleic anhydride; or chosen from among ethylenically-unsaturated monomers with a sulfonic function in their acid or salt form, and preferentially from among acrylamido-2-methyl-2-propane-sulfonic acid, sodium methallylsulfonate, sulfonic vinyl acid, and sulfonic styrene acid; or chosen from among ethylenically-unsaturated oxyalkylated monomers with a phosphoric function in their acid or salt form, and preferentially from among phosphoric vinyl acid, ethylene glycol methacrylate phosphate, propylene glycol methacrylate phosphate, ethylene glycol acrylate phosphate, propylene glycol acrylate phosphate and their ethoxylates; or from among ethylenically-unsaturated monomers with a phosphonic function in their acid or salt form, and is preferentially phosphonic vinyl acid; or mixtures thereof,
- b) 5% to 95%, preferentially 5% to 50%, and very preferentially 5% to 30% of at least one ethylenically-unsat urated oxyalkylated monomer terminated by a hydrophobic chain, whose general formula (I) is:

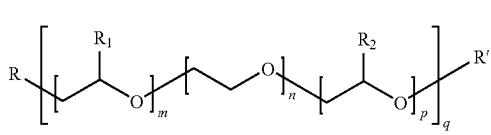

wherein:
- m and p represent a number of alkylene oxide units less than or equal to 100, n represents a number of ethylene oxide units less than or equal to 100, and q is a number at least equal to 1, with $0 \leqq q(n+m+p) \leqq 100$,
- $R_1$ represents hydrogen or the methyl or ethyl radical,
- $R_2$ represents hydrogen or the methyl or ethyl radical,
- R represents the polymerizable unsaturated radical belonging to the group of acrylic, methacrylic, maleic, itaconic, crotonic, and vinylphtalic esters, as well as unsaturated urethanes such as, for example, acrylurethanes, methacrylurethanes, α-α' dimethyl-m-isopropenyl-benzylurethannes, and allylurethane,
- R' represents a hydrophobic radical, chosen from among the radical tristyrylphenyl or from among dialkylamines with at least 8 carbon atoms, or from among linear or branched alkyl, alkylaryl, arylalkyl, and aryl groups with at least 8 carbon atoms, preferentially 10 to 24 carbon atoms, and very preferentially from 16 to 20 carbon atoms each with two branches having at least six carbon atoms, or mixtures of these radicals, R' being extremely preferentially chosen from among 2-hexyl 1-decanyl and 2-octyl 1-dodecanyl or mixtures thereof.

This method is further characterized in that said water-soluble copolymer is obtained by radical polymerization methods in a solution, in a direct or inverse emulsion, in a suspension or precipitation in solvents, in the presence of catalytic systems and transfer agents, or by controlled radical polymerization methods, and preferentially by nitroxide-mediated polymerization (NMP) or cobaloxyme-mediated polymerization, by atom transfer radical polymerization (ATRP), by sulfur-derivative controlled radical polymerization, said sulfur derivatives being chosen from among carbamates, dithioesters, trithiocarbonates (RAFT), or xanthates.

This method is further characterized in that said water-soluble copolymer, obtained in an acidic and potentially distilled form, may also be fully or partially neutralized by one or more neutralization agents having a monovalent or polyvalent function, chosen from the group made up of alkaline cations, and preferentially from among sodium, potassium, or ammonium, or chosen from among the group made up of primary, secondary, or tertiary aliphatic and/or cyclical amines, and preferentially from among stearylamine, ethanolamines (mono-, di-, and triethanolamine), mono- and diethylamine, cyclohexylamine, and methylcyclohexylamine; or chosen from the group made up of divalent alkaline-earth cations, and preferentially from among magnesia, calcium, and zinc; or chosen from the group made up by trivalent cations, and preferentially aluminum.

Each neutralization agent then becomes involved in accordance with neutralization rates specific to each valence function.

This method is further characterized in that the copolymer resulting from the copolymerization reaction may potentially, before or after the total or partial neutralization, be treated and separated into multiple phases, in accordance with static or dynamic methods known to the person skilled in the art, by one or more polar solvents preferentially belonging to the group made up of water, methanol, ethanol, propanol, isopropanol, butanols, acetone, tetrahydrofurane, or mixtures thereof.

One of the phases corresponds to the copolymer used in accordance with the invention as a grinding aid agent for mineral materials in an aqueous suspension.

This method is further characterized in that a quantity of said water-soluble copolymer between 0.1% and 3%, preferentially 0.2% to 1.5%, and very preferentially 0.3% to 1% by dry weight compared to the total weight of the mineral materials is used.

This method is further characterized in that the aqueous dispersion and/or suspension of mineral materials contains at least 10%, preferentially at least 20%, very preferentially at least 50% and extremely preferentially at least 70% by dry weight of mineral materials, in relation to its total weight.

This method is further characterized in that said mineral materials are chosen from natural or synthetic calcium carbonate, dolomites, limestone, kaolin, talc, gypsum, lime, magnesia, titanium dioxide, satin white, aluminum trioxide or aluminum trihydroxide, silicas, mica and the mixture of these charges, such as mixtures of talc-calcium carbonate, calcium carbonate-kaolin, or mixtures of calcium carbonate with aluminum trihydroxide or aluminum trioxide, or mixtures with synthetic or natural fibers, or co-structures of minerals such as talc-calcium carbonate or talc-titanium dioxide co-structures, or mixtures thereof, and in that said mineral materials are preferably chosen from natural or synthetic calcium carbonate or talc or mixtures thereof, and in that they are very preferably chosen from natural or synthetic calcium carbonate or mixtures thereof.

Another object of the invention resides in the sheets of paper characterized in that they contain mineral materials, and at least one water-soluble copolymer made up of:
- a) at least one ethylenically-unsaturated anionic monomer,
- b) at least one ethylenically-unsaturated oxylalkylated monomer, terminating in a hydrophobic chain.

These sheets are further characterized in that said mineral materials have been ground and/or dispersed in an aqueous medium in the presence of said copolymer.

These sheets are further characterized in that said copolymer is made up of:
- a) at least one ethylenically-unsaturated anionic monomer which is an ethylenically-unsaturated anionic monomer in an acid or salt form, chosen from among ethylenically-unsaturated anionic monomers with a monocarboxylic function in their acid or salt form, and preferentially from among acrylic, methacrylic, crotonic, isocrotonic, or cinnamic acid, or diacid hemiesters such as $C_1$-$C_4$ monoesters of maleic or itaconic acides; or chosen from among ethylenically-unsaturated monomers with a dicarboxylic function in their acid or salt form, and preferentially from among itaconic, maleic, fumaric, mesaconic, or citraconic acid, or carboxylic acid anhydrides, such as maleic anhydride; or chosen from among ethylenically-unsaturated monomers with a sulfonic function in their acid or salt form, and preferentially from among acrylamido-2-methyl-2-propanesulfonic acid, sodium methallylsulfonate, sulfonic vinyl acid, and sulfonic styrene acid; or chosen from among ethylenically-unsaturated monomers with a phosphoric function in their acid or salt form, and preferentially from among phosphoric vinyl acid, ethylene glycol methacrylate phosphate, propylene glycol methacrylate phosphate, ethylene glycol acrylate phosphate, propylene glycol acrylate phosphate and their ethoxylates; or from among ethylenically-unsaturated monomers with a phosphonic function in their acid or salt form, and is preferentially phosphonic vinyl acid; or mixtures thereof, b) at least one ethylenically-unsaturated oxyalkylated monomer terminated by a hydrophobic chain, whose general formula (I) is:

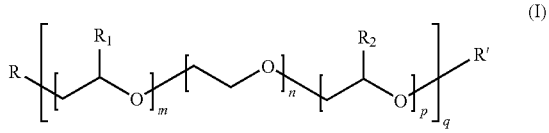

wherein:
m and p represent a number of alkylene oxide units less than or equal to 100, n represents a number of ethylene oxide units less than or equal to 100, and q is a number at least equal to 1, with $0 \leq q(n+m+p) \leq 100$, $R_1$ represents hydrogen or the methyl or ethyl radical, $R_2$ represents hydrogen or the methyl or ethyl radical, R represents the polymerizable unsaturated radical belonging to the group of acrylic, methacrylic, maleic, itaconic, crotonic, and vinylphtalic esters, as well as unsaturated urethanes such as, for example, acrylurethanes, methacrylurethanes, α-α' dimethyl-m-isopropenyl-benzylurethannes, and allylurethane, R' represents a hydrophobic radical.

These sheets are further characterized in that the radical R' is chosen from among the radical tristyrylphenyl or from among dialkylamines with at least 8 carbon atoms, or from among linear or branched alkyl, alkylaryl, arylalkyl, and aryl groups with at least 8 carbon atoms, preferentially 10 to 24 carbon atoms, and very preferentially from 16 to 20 carbon atoms each with two branches having at least six carbon atoms, or mixtures of these radicals, and in that the radical R' is extremely preferentially chosen from among 2-hexyl 1-decanyl and 2-octyl 1-dodecanyl or mixtures thereof.

These sheets are further characterized in that in addition to at least one a) monomer and at least one b) monomer, said copolymer further contains at least one other monomer, chosen from among an acrylamide or methacrylamide monomer or derivatives thereof, such as N-[3-(dimethylamino)propyl] acrylamide or N-[3-(dimethylamino)propyl]methacrylamide, and mixtures thereof; or from among a non-water-soluble monomer such as alkyl acrylates or methacrylates, unsaturated esters such as N-[2-(dimethylamino)ethyl]methacrylate, or N-[2-(dimethylamino)ethyl]acrylate, vinylics such as vinyl acetate, vinylpyrrolidone, styrene, alphamethylstyrene and derivatives thereof; or from among a cationic or quaternary ammonium monomer such as, preferentially, [2-(methacryloyloxy)ethyl]trimethyl ammonium sulfate or chloride, [2-(acryloyloxy)ethyl]trimethyl ammonium sulfate or chloride, [3-(acrylamido)propyl]trimethyl ammonium sulfate or chloride, dimethyl diallyl ammonium sulfate or chloride, [3-(methacrylamido)propyl]trimethyl ammonium sulfate or chloride; or from among an organofluorated or organosililated monomer, or from among those cross-linking monomers (i.e. monomers with at least two ethylene unsaturations) that are well known to the person skilled in the art, or mixtures of these monomers.

These sheets are further characterized in that said water-soluble copolymer is made up of the following components, each expressed as a percentage by weight:

a) 5% to 95%, preferentially 50% to 95%, and very preferentially 70% to 95% of at least one ethylenically-unsaturated anionic monomer which is an ethylenically-unsaturated anionic monomer in an acid or salt form, chosen from among ethylenically-unsaturated anionic monomers with a monocarboxylic function in their acid or salt form, and preferentially from among acrylic, methacrylic, crotonic, isocrotonic, or cinnamic acid, or diacid hemiesters such as $C_1$-$C_4$ monoesters of maleic or itaconic acides; or chosen from among ethylenically-unsaturated monomers with a dicarboxylic function in their acid or salt form, and preferentially from among itaconic, maleic, fumaric, mesaconic, or citraconic acid, or carboxylic acid anhydrides, such as maleic anhydride; or chosen from among ethylenically-unsaturated monomers with a sulfonic function in their acid or salt form, and preferentially from among acrylamido-2-methyl-2-propane-sulfonic acid, sodium methallylsulfonate, sulfonic vinyl acid, and sulfonic styrene acid; or chosen from among ethylenically-unsaturated monomers with a phosphoric function in their acid or salt form, and preferentially from among phosphoric vinyl acid, ethylene glycol methacrylate phosphate, propylene glycol methacrylate phosphate, ethylene glycol acrylate phosphate, propylene glycol acrylate phosphate and their ethoxylates; or from among ethylenically-unsaturated monomers with a phosphonic function in their acid or salt form, and is preferentially phosphonic vinyl acid; or mixtures thereof, b) 5% to 95%, preferentially 5% to 50%, and very preferentially 5% to 30% of at least one ethylenically-unsaturated monomer terminated by a hydrophobic chain, whose general formula (I) is:

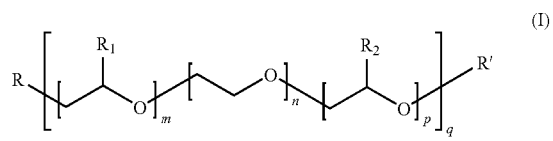

wherein:
m and p represent a number of alkylene oxide units less than or equal to 100, n represents a number of ethylene oxide units less than or equal to 100, and q is a number at least equal to 1, with $0 \leq q(n+m+p) \leq 100$, $R_1$ represents hydrogen or the methyl or ethyl radical, $R_2$ represents hydrogen or the methyl or ethyl radical, R represents the polymerizable unsaturated radical belonging to the group of acrylic, methacrylic, maleic, itaconic, crotonic, and vinylphtalic esters, as well as unsaturated urethanes such as, for example, acrylurethanes, methacrylurethanes, α-α' dimethyl-m-isopropenyl-benzylurethannes, and allylurethane, R' represents a hydrophobic radical, chosen from among the radical tristyrylphenyl or from among dialkylamines with at least 8 carbon atoms, or from among linear or branched alkyl, alkylaryl, arylalkyl, and aryl groups with at least 8 carbon atoms, preferentially 10 to 24 carbon atoms, and very preferentially from 16 to 20 carbon atoms each with two branches having at least six carbon atoms, or mixtures of these radicals, R' being extremely preferentially chosen from among 2-hexyl 1-decanyl and 2-octyl 1-dodecanyl or mixtures thereof.

These sheets are further characterized in that said water-soluble copolymer is obtained by radical polymerization methods in a solution, in a direct or inverse emulsion, in a suspension or precipitation in solvents, in the presence of catalytic systems and transfer agents, or by controlled radical polymerization methods, and preferentially by nitroxide-mediated polymerization (NMP) or cobaloxyme-mediated polymerization, by atom transfer radical polymerization (ATRP), by sulfur-derivative controlled radical polymerization, said sulfur derivatives being chosen from among carbamates, dithioesters, trithiocarbonates (RAFT), or xanthates.

These sheets are further characterized in that said water-soluble copolymer, obtained in an acidic and potentially distilled form, may also be fully or partially neutralized by one or more neutralization agents having a monovalent or polyvalent function, chosen from the group made up of alkaline cations, and preferentially from among sodium, potassium, or ammonium, or chosen from among the group made up of primary, secondary, or tertiary aliphatic and/or cyclical amines, and preferentially from among stearylamine, ethanolamines (mono-, di-, and triethanolamine), mono- and diethylamine, cyclohexylamine, and methylcyclohexylamine; or chosen from the group made up of divalent alkaline-earth cations, and preferentially from among magnesia, calcium, and zinc; or chosen from the group made up by trivalent cations, and preferentially aluminum.

Each neutralization agent then becomes involved in accordance with neutralization rates specific to each valence function.

In another variant, the copolymer resulting from the copolymerization reaction may potentially, before or after the total or partial neutralization, be treated and separated into multiple phases, in accordance with static or dynamic methods known to the person skilled in the art, by one or more polar solvents preferentially belonging to the group made up of water, methanol, ethanol, propanol, isopropanol, butanols, acetone, tetrahydrofurane, or mixtures thereof.

One of the phases corresponds to the copolymer used in accordance with the invention as a grinding aid agent for mineral materials in an aqueous suspension.

These sheets are further characterized in that said mineral materials are chosen from natural or synthetic calcium carbonate, dolomites, limestone, kaolin, talc, gypsum, lime, magnesia, titanium dioxide, satin white, aluminum trioxide or aluminum trihydroxide, silicas, mica and the mixture of these loads, such as mixtures of talc-calcium carbonate, calcium carbonate-kaolin, or mixtures of calcium carbonate with aluminum trihydroxide or aluminum trioxide, or mixtures with synthetic or natural fibers, or co-structures of minerals such as talc-calcium carbonate or talc-titanium dioxide co-structures, or mixtures thereof, and in that said mineral materials are preferably chosen from natural or synthetic calcium carbonate or talc or mixtures thereof, and in that they are very preferably chosen from natural or synthetic calcium carbonate or mixtures thereof.

The examples that follow make it possible to better understand the benefits of the invention, though without limiting its scope.

EXAMPLES

Example 1

The purpose of this example is to illustrate the use, when manufacturing a sheet of paper, of an aqueous suspension of calcium carbonate ground with a copolymer in accordance with the invention.

This example also demonstrates that such a use makes it possible to slow the penetration of a paper coating into said sheet, compared with a sheet containing a calcium carbonate with a grinding agent as found in the prior art.

This example also illustrates the inventive sheets of paper.

For each of the tests nos. 1 to 4, first an aqueous suspension of calcium carbonate is prepared through grinding, in accordance with the methods well known to a person skilled in the art (especially as indicated in the document FR 2,846,978), either in the presence of a grinding aid agent as found in the prior art (tests nos. 1 and 2) or in the presence of a copolymer in accordance with the invention (tests nos. 3 to 4).

Second, for each of the tests nos. 1 to 4, handsheet molds, i.e. sheets of paper, are created from a thermo-mechanical pulp (100% whitened with hydrogen peroxide) and an aqueous suspension of calcium carbonate obtained in accordance with each of the tests nos. 1 to 4, so that the percentage of calcium carbonate by dry weight in the handsheet mold is equal to 8% of its total weight. The handsheet mold is created using a Rapid Köthen™ laboratory device.

Third, a paper coating is created, made up of:
  80 parts by dry weight of a calcium carbonate sold by the company OMYA™ under the name Hydrocarb™ 90,
  20 parts by dry weight of Brazilian kaolin,
  6 parts by dry weight of DL966 styrene-butadiene latex sold by the company DOW™ CHEMICALS,
  6 parts by dry weight of C-Film™ oxidized starch sold by the company CERESTAR™,
said paper coating having a dry matter content equal to 63% of its total weight.

Fifth and lastly, the penetration speed of this paper coating into the handsheet mold (sheet of paper) is measured, using an EMTEC™ PDA C2 device sold by the company EMTEC™. This device makes it possible to dynamically determine the penetration of a liquid into a medium such as paper, using ultrasound.

This device operates as follows: an ultrasound signal is used to quantify the interactions between paper and liquid. The paper coating, penetrating into the paper, changes the ultrasound transmission, and thereby the intensity read at the receiver. This change in intensity over time is represented on a graph of Intensity (%) over Time (s).

The interaction between the paper coating and the medium is determined by the surface's structure, in particular by its porous structure, but also the quality of the paper coating.

The "ideal" curve, after the sheet comes into contact with the paper coating, reaches a peak during the first few milliseconds ($1^{st}$ phase) and then slowly decreases ($2^{nd}$ phase).

This may manifest as:
  an even penetration of the paper coating, and rapid immobilization on the paper medium during the $1^{st}$ phase; in such a case, there is little or no trapped air, and therefore little or no dispersion of the ultrasound signal; an increase in the ultrasound transmission, and thus an increase in intensity read at the receiver, is thereby observed,
  the immobilization of the paper coating continues within the medium during a $2^{nd}$ phase with a slowing of the penetration of said paper coating, due to the film that has formed; during this phase, the faster the paper coating penetrates, the greater the quantity of air that is trapped; the localized areas where air is trapped act as ultrasound signal diffusion points; when this happens, a decrease in the signal's intensity is observed, which is therefore even greater when the quantity of air trapped is high, i.e. when the paper coating's penetration speed is high.

Consequently, comparing the intensity-over-time curves for the various handsheet molds containing the various aqueous suspensions of calcium carbonate makes it possible to determine which handsheet molds (and therefore which aqueous suspensions) lead to the best paper coating-penetration resistance.

Test No. 1

This test illustrates the prior art, and uses, as a grinding aid agent, 0.45% by dry weight, in relation to the calcium carbonate's dry weight, of a fully neutralized acrylic acid homopolymer.

Test No. 2

This test illustrates the prior art and uses, as a grinding aid agent, 0.45% by dry weight, in relation to the calcium carbonate's dry weight, of a fully neutralized water-soluble copolymer, made up of:
a) 75% by weight of acrylic acid,
b) 25% by weight of lauryl acrylate.

Test No. 3

This test illustrates the invention and uses, as a grinding aid agent, 0.45% by dry weight, in relation to the calcium carbonate's dry weight, of a fully neutralized water-soluble copolymer, made up of:
d) 75% by weight of acrylic acid,
e) 25% by weight of the formula (I) monomer, wherein:
R represents a methacrylate radical,
R' represents the non-aromatic hydrophobic chain with 20 2-octyl 1-dodecanyl carbon atoms,
$m=p=0$,
$q=1$,
$n=25$.

Test No. 4

This test illustrates the invention and uses, as a grinding aid agent, 0.45% by dry weight, in relation to the calcium carbonate's dry weight, of a fully neutralized water-soluble copolymer, made up of:
a) 75% by weight of acrylic acid,
b) 25% by weight of the formula (I) monomer, wherein:
R represents a methacrylate radical,
R' represents a linear hydrophobic chain with 16 2-hexyl 1-decanyl carbon atoms,
$m=p=0$,
$q=1$,
$n=25$.

The characteristics of the aqueous suspensions of calcium carbonate created for tests nos. 1 to 4 (solids content, Brookfield™ viscosities measured at 10 and 100 revolutions per minute at the moment t=0 and at t=8 days after agitation, and their particle size distribution as measured by a Sedigraph™ 5100 sold by the company MICROMERITICS™) are given in Table 3.

TABLE 1

| Test no. | prior art/ invention | solids content (%)* | particle size distribution (% < 2 μm)** | μt = 0*** 10 rpm | μt = 0*** 100 rpm | μt = 8 d**** 10 rpm | μt = 8 d**** 100 rpm |
|---|---|---|---|---|---|---|---|
| 1 | prior art | 74.6 | 74.8 | 335 | 160 | 600 | 205 |
| 2 | prior art | 75 | 74.3 | 1455 | 335 | 1780 | 345 |
| 3 | invention | 74.5 | 76.6 | 3380 | 635 | 4460 | 835 |
| 4 | invention | 74.5 | 75.2 | 2790 | 550 | 4630 | 810 |

*solids content expressed as a percentage, by dry weight, of calcium carbonate compared to the suspension's total weight
**percentage of particles, by weight, whose diameter is less than 2 μm
***Brookfield™ viscosity measured at the moment t = 0, and at 10 or 100 revolutions per minute
****Brookfield™ viscosity measured at the moment t = 8 days and after agitation, and at 10 or 100 revolutions per minute.

This table shows that the characteristics of the aqueous suspensions of calcium carbonate obtained in accordance with the invention are compatible with a use as fillers (in terms of solids content, particle size distribution, and Brookfield™ viscosities).

The intensity-over-time curves for tests no. 1 to 4 have been shown in FIG. 1/1. Examining this figure clearly shows that the handsheet molds created with an aqueous suspension of calcium carbonate, ground in accordance with the invention, lead to higher intensities, and therefore to a significant slowing in the penetration of the paper coating over time.

Example 2

The purpose of this example is to illustrate the use, when manufacturing a sheet of paper, of an aqueous suspension of calcium carbonate ground with a copolymer in accordance with the invention.

This example also demonstrates that such a use makes it possible to slow the penetration of a paper coating into said sheet, compared with a sheet containing a calcium carbonate with a grinding agent as found in the prior art.

This example also illustrates the inventive sheets of paper.

For each of the tests nos. 5 to 16, first an aqueous suspension of calcium carbonate is prepared through grinding, in accordance with the methods well known to a person skilled in the art (especially as indicated in the document FR 2,846, 978), either in the presence of a grinding aid agent as found in the prior art (tests nos. 5 to 7) or in the presence of a copolymer according to the invention (tests nos. 8 to 16).

In the same manner as for example 1, first a paper handsheet mold and then a paper coating is created (with a composition identical to that of example 1), and the penetration of each paper coating into the handsheet mold in accordance with the protocol used in example 1 is tracked.

Test No. 5

This test illustrates the prior art, and uses, as a grinding aid agent, 0.50% by dry weight, in relation to the calcium carbonate's dry weight, of a fully sodium-neutralized acrylic acid homopolymer.

Test No. 6

This test illustrates the prior art and uses, as a grinding aid agent, 0.50% by dry weight, in relation to the calcium carbonate's dry weight, of a fully sodium-neutralized copolymer of acrylic acid and methacrylic acid (50% of both of these monomers, by weight).

Test No. 7

This test illustrates the prior art and uses, as a grinding aid agent, 0.50% by dry weight, in relation to the calcium carbonate's dry weight, of a fully sodium-neutralized copolymer of acrylic acid and maleic anhydride (50% of both of these monomers, by weight).

Test No. 8

This test illustrates the invention and uses, as a grinding aid agent, 0.50% by dry weight, in relation to the calcium carbonate's dry weight, of a fully neutralized water-soluble copolymer, made up of:
a) 80% by weight of acrylic acid,
b) 20% by weight of the formula (I) monomer, wherein:
R represents a methacrylate radical,
R' represents the non-aromatic hydrophobic chain with 20 2-octyl 1-dodecanyl carbon atoms,
$m=p=0$, $q=1$, $n=25$.

Test No. 9

This test illustrates the invention and uses, as a grinding aid agent, 0.50% by dry weight, in relation to the calcium car bonate's dry weight, of a fully neutralized water-soluble copolymer, made up of:
 a) 85% by weight of acrylic acid,
 b) 15% by weight of the formula (I) monomer, wherein:
  R represents a methacrylate radical,
  R' represents the non-aromatic hydrophobic chain with 20 2-octyl 1-dodecanyl carbon atoms,
  m=p=0, q=1, n=25.

Test No. 10

This test illustrates the invention and uses, as a grinding aid agent, 0.50% by dry weight, in relation to the calcium carbonate's dry weight, of a fully neutralized water-soluble copolymer, made up of:
 a) 90% by weight of acrylic acid,
 b) 10% by weight of the formula (I) monomer, wherein:
  R represents a methacrylate radical,
  R' represents the non-aromatic hydrophobic chain with 20 2-octyl 1-dodecanyl carbon atoms,
  m=p=0, q=1, n=25.

Test No. 11

This test illustrates the invention and uses, as a grinding aid agent, 0.50% by dry weight, in relation to the calcium carbonate's dry weight, of a fully neutralized water-soluble copolymer, made up of:
 a) 80% by weight of acrylic acid,
 b) 20% by weight of the formula (I) monomer, wherein:
  R represents a methacrylate radical,
  R' represents a chain with 16 2-hexyl 1-decanyl carbon atoms,
  m=p=0, q=1, n=25.

Test No. 12

This test illustrates the invention and uses, as a grinding aid agent, 0.50% by dry weight, in relation to the calcium carbonate's dry weight, of a fully neutralized water-soluble copolymer, made up of:
 a) 85% by weight of acrylic acid,
 b) 15% by weight of the formula (I) monomer, wherein:
  R represents a methacrylate radical,
  R' represents a chain with 16 2-hexyl 1-decanyl carbon atoms,
  m=p=0, q=1, n=25.

Test No. 13

This test illustrates the invention and uses, as a grinding aid agent, 0.50% by dry weight, in relation to the calcium carbonate's dry weight, of a fully neutralized water-soluble copolymer, made up of:
 a) 90% by weight of acrylic acid,
 b) 10% by weight of the formula (I) monomer, wherein:
  R represents a methacrylate radical,
  R' represents a linear hydrophobic chain with 16 2-hexyl 1-decanyl carbon atoms,
  m=p=0, q=1, n=25.

Test No. 14

This test illustrates the invention and uses, as a grinding aid agent, 0.50% by dry weight, in relation to the calcium carbonate's dry weight, of a fully neutralized water-soluble copolymer, made up of:
 a) 75% by weight of acrylic acid,
 b) 25% by weight of the formula (I) monomer, wherein:
  R represents a methacrylate radical,
  R' represents tristyrylphenyl,
  m=p=0, q=1, n=25.

Test No. 15

This test illustrates the invention and uses, as a grinding aid agent, 0.50% by dry weight, in relation to the calcium car bonate's dry weight, of a fully neutralized water-soluble copolymer, made up of:
 a) 80% by weight of acrylic acid,
 b) 20% by weight of the formula (I) monomer, wherein:
  R represents a methacrylate radical,
  R' represents tristyrylphenyl,
  m=p=0, q=1, n=40.

Test No. 16

This test illustrates the invention and uses, as a grinding aid agent, 0.50% by dry weight, in relation to the calcium carbonate's dry weight, of a fully neutralized water-soluble copolymer, made up of:
 a) 85% by weight of acrylic acid,
 b) 15% by weight of the formula (I) monomer, wherein:
  R represents a methacrylate radical,
  R' represents tristyrylphenyl,
  m=p=0, q=1, n=60.

The characteristics of the aqueous suspensions of calcium carbonate created for tests nos. 5 to 16 (solids content, Brookfield™ viscosities measured at 10 and 100 revolutions per minute at the moment t=0 and at t=8 days after agitation, and their particle size distribution as measured by a Sedigraph™ 5100 sold by the company MICROMERITICS™) are given in Table 3.

Table 3 shows that the characteristics of the inventive aqueous suspensions make them entirely suitable for handling, as well as compatible with a use for manufacturing paper coatings.

TABLE 3

| Test no. | prior art/ invention | solids content (%)* | Particle size distribution (% < 2 μm)** | μt = 0*** 10 rpm | μt = 0*** 100 rpm | μt = 8 d**** 10 rpm | μt = 8 d**** 100 rpm |
|---|---|---|---|---|---|---|---|
| 5 | prior art | 74.6 | 74.8 | 310 | 150 | 550 | 200 |
| 6 | prior art | 75 | 74.3 | 1400 | 300 | 1650 | 310 |
| 7 | prior art | 74.5 | 76.6 | 1920 | 450 | 2220 | 750 |
| 8 | invention | 74.5 | 75.2 | 2850 | 450 | 4200 | 800 |
| 9 | invention | 75 | 75 | 2950 | 480 | 3750 | 720 |
| 10 | invention | 74.5 | 75.1 | 3100 | 500 | 3920 | 750 |
| 11 | invention | 74.6 | 74.6 | 2990 | 480 | 4050 | 810 |
| 12 | invention | 74.5 | 74.5 | 2820 | 410 | 3870 | 760 |
| 13 | invention | 74.7 | 74.3 | 2850 | 390 | 3910 | 790 |
| 14 | invention | 75 | 74.4 | 3100 | 490 | 4000 | 810 |
| 15 | invention | 74.2 | 74.6 | 3000 | 470 | 3980 | 790 |
| 16 | invention | 74.3 | 74.3 | 3010 | 460 | 4010 | 780 |

*solids content expressed as a percentage, by dry weight, of calcium carbonate compared to the suspension's total weight
**percentage of particles, by weight, whose diameter is less than 2 μm
***Brookfield ™ viscosity measured at the moment t = 0, and at 10 or 100 revolutions per minute
****Brookfield ™ viscosity measured at the moment t = 8 days and after agitation, and at 10 or 100 revolutions per minute.

For each of the tests, the value of the intensity, measured with an EMTEC™ device, was recorded at the moments t=0.1, 0.5, and 1 second. The results appear in Table 4.

The intensity is always higher for the invention than for the prior art, regardless of when the measurement is taken. This clearly shows that there is less air trapped in the experiments implementing the invention: the paper coating is slowed down when penetrating into the paper handsheet mold.

TABLE 4

| | Test no. | | | | | |
|---|---|---|---|---|---|---|
| | 5 | 6 | 7 | 8 | 9 | 10 |
| Prior Art/INvention | PA | PA | PA | IN | IN | IN |
| $I_{0.1}$ (%) | 103.2 | 103.0 | 102.9 | 106.4 | 107.5 | 106.5 |

TABLE 4-continued

| $I_{0.5}$ (%) | 97.8 | 98.0 | 97.6 | 100.0 | 101.2 | 100.9 |
| $I_1$ (%) | 90.7 | 91.0 | 90.9 | 96.0 | 97.9 | 97.5 |

| | Test no. | | | | | |
|---|---|---|---|---|---|---|
| | 11 | 12 | 13 | 14 | 15 | 16 |
| Prior Art/INvention | IN | IN | IN | IN | IN | IN |
| $I_{0.1}$ (%) | 107.2 | 108.1 | 107.4 | 106.3 | 107.6 | 106.4 |
| $I_{0.5}$ (%) | 102.2 | 102.5 | 102.1 | 100.0 | 101.1 | 100.2 |
| $I_1$ (%) | 98.2 | 98.3 | 98.0 | 96.2 | 97.0 | 97.0 |

Example 3

The purpose of this example is to illustrate the use, when manufacturing a sheet of paper, of an aqueous dispersion of calcium carbonate dispersed with a copolymer in accordance with the invention.

This example also demonstrates that such a use makes it possible to slow the penetration of a paper coating into said sheet, compared with a sheet containing a calcium carbonate with a dispersing agent as found in the prior art.

This example also illustrates the inventive sheets of paper.

For each of the tests nos. 17 to 19, first an aqueous dispersion of calcium carbonate is prepared by thermally concentrating a cake of calcium carbonate with an initial solids content equal to 40% of its total weight into one with a solids content greater than 50% of its dry weight, in the presence of a dispersing agent as found in the prior art or in accordance with the invention.

Such a method is particularly described in the document FR 2,802,830.

In the same manner as for example 1, first a paper handsheet mold and then a paper coating is created (with a composition identical to that of example 1), and the penetration of each paper coating into the handsheet mold in accordance with the protocol used in example 1 is tracked.

Test No. 17

This test illustrates the prior art and uses, as a dispersing agent, 0.60% by dry weight, in relation to the calcium carbonate's dry weight, of a copolymer of acrylic acid and maleic anhydride.

Test No. 18

This test illustrates the invention and uses, as a dispersing agent, 0.60% by dry weight, in relation to the calcium carbonate's dry weight, of a fully neutralized water-soluble copolymer, made up of:
a) 80% by weight of acrylic acid,
b) 20% by weight of the formula (I) monomer, wherein:
   R represents a methacrylate radical,
   R' represents the non-aromatic hydrophobic chain with 20 2-octyl 1-dodecanyl carbon atoms,
   m=p=0, q=1, n=25.

Test No. 19

This test illustrates the invention and uses, as a dispersing agent, 0.60% by dry weight, in relation to the calcium carbonate's dry weight, of a fully neutralized water-soluble copolymer, made up of:
a) 80% by weight of acrylic acid,
b) 20% by weight of the formula (I) monomer, wherein:
   R represents a methacrylate radical,
   R' represents a linear hydrophobic chain with 16 2-hexyl 1-decanyl carbon atoms,
   m=p=0, q=1, n=25.

The characteristics of the aqueous dispersions of calcium carbonate created for tests nos. 17 to 19 (solids content, Brookfield™ viscosities measured at 10 and 100 revolutions per minute at t=0 and t=8 days after agitation) are given in Table 5.

Table 5 shows that the characteristics of the inventive aqueous suspensions make them entirely suitable for handling, as well as compatible with a use for manufacturing paper coatings.

TABLE 5

| Test no. | prior art/ invention | solids content (%)* | µt = 0*** | | µt = 8 d**** | |
|---|---|---|---|---|---|---|
| | | | 10 rpm | 100 rpm | 10 rpm | 100 rpm |
| 5 | prior art | 50.2 | 280 | 140 | 480 | 200 |
| 8 | invention | 50.4 | 2020 | 430 | 2350 | 900 |
| 9 | invention | 50.3 | 2050 | 450 | 2750 | 850 |

*solids content expressed as a percentage, by dry weight, of calcium carbonate in relation to the suspension's total weight
***Brookfield ™ viscosity measured at the moment t = 0, and at 10 or 100 revolutions per minute
****Brookfield ™ viscosity measured at the moment t = 8 days and after agitation, and at 10 or 100 revolutions per minute.

For each of the tests, the value of the intensity, measured with an EMTEC™ device, was recorded at the moments t=0.1, 0.5, and 1 second. The results appear in Table 6.

The intensity is always higher for the invention than for the prior art, regardless of when the measurement is taken. This clearly shows that there is less air trapped in the experiments implementing the invention: the paper coating is slowed down when penetrating into the paper handsheet mold.

TABLE 6

| | Test no. | | |
|---|---|---|---|
| | 17 | 18 | 19 |
| | Prior Art/INvention | | |
| | PA | IN | IN |
| $I_{0.1}$ (%) | 101.1 | 104.5 | 104.5 |
| $I_{0.5}$ (%) | 96.5 | 97.9 | 97.9 |
| $I_1$ (%) | 87.7 | 95.3 | 95.5 |

The invention claimed is:

1. A method for manufacturing a sheet of paper from a papermaking pulp, wherein the papermaking pulp is derived from mixing:
   a natural fiber, a synthetic fiber, or a mixture thereof;
   water; and
   an aqueous suspension or dispersion comprising an agent for slowing the penetration of a paper coating into the sheet of paper, wherein the agent comprises a mineral material and a water-soluble copolymer, wherein the water-soluble copolymer comprises:

a) at least one ethylenically-unsaturated anionic monomer in an acid or salt form selected from the group consisting of:
   an ethylenically-unsaturated anionic monomer having a monocarboxylic functional group in acid or salt form and selected from the group consisting of acrylic acid, methacrylic acid, crotonic acid, isocrotonic acid, cinnamic acid, a $C_1$-$C_4$ monoester of maleic acid, and a $C_1$-$C_4$ monoester of itaconic acid;
   an ethylenically-unsaturated monomer having a dicarboxylic functional group in acid or salt form and selected from the group consisting of itaconic acid, maleic acid, fumaric acid, mesaconic acid, citraconic acid, and maleic anhydride;

an ethylenically-unsaturated monomer having a sulfonic functional group in acid or salt form and selected from the group consisting of acrylamido-2-methyl-2-propane-sulfonic acid, sodium methallylsulfonate, sulfonic vinyl acid, and sulfonic styrene acid;

an ethylenically-unsaturated monomer having a phosphoric functional group in acid or salt form and selected from the group consisting of phosphoric vinyl acid, ethylene glycol methacrylate phosphate, propylene glycol methacrylate phosphate, ethylene glycol acrylate phosphate, propylene glycol acrylate phosphate, and ethoxylates thereof;

an ethylenically-unsaturated monomer of phosphonic vinyl acid having a phosphonic functional group in acid or salt form; and mixtures thereof; and b) at least one ethylenically-unsaturated oxyalkylated monomer terminated by a hydrophobic chain, represented by the following general formula (I):

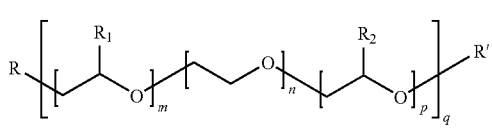

wherein:
m and p represent a number of alkylene oxide units less than or equal to 100, n represents a number of ethylene oxide units less than or equal to 100, and q is a number at least equal to 1, with $0 \leq q(n+m+p) \leq 100$, $R_1$ represents a hydrogen atom, a methyl radical or an ethyl radical, $R_2$ represents a hydrogen atom, a methyl radical or an ethyl radical, R represents a polymerizable unsaturated radical selected from the group consisting of acrylic acid, methacrylic acid, maleic acid, itaconic acid, crotonic acid, an ester of vinylphthalic acid, an acrylurethane, a methacrylurethane, an α,α'-dimethyl-m-isopropenyl-benzylurethane, and an allylurethane, and R' represents a hydrophobic radical which is a branched alkyl, alkylaryl, arylalkyl, or aryl group having 16 to 20 carbon atoms with two branches having at least 6 carbon atoms, or mixtures of these radicals.

2. The method according to claim 1, wherein the water-soluble copolymer further comprises:

c) at least one additional monomer selected from the group consisting of: an acrylamide monomer, a methacrylamide monomer, derivatives thereof, and mixtures thereof; a non-water-soluble monomer; a cationic ammonium monomer; a quaternary ammonium monomer; an organofluorated monomer; an organosililated monomer; a cross-linking monomer having at least two ethylene unsaturations; mixtures of these monomers.

3. The method according to claim 1, wherein the water-soluble copolymer comprises:

a) 5-95 wt. % of at least one ethylenically-unsaturated anionic monomer in an acid or salt form selected from the group consisting of:

an ethylenically-unsaturated anionic monomer having a monocarboxylic functional group in acid or salt form and selected from the group consisting of acrylic acid, methacrylic acid, crotonic acid, isocrotonic acid, cinnamic acid, a $C_1$-$C_4$ monoester of maleic acid, and a $C_1$-$C_4$ monoester of itaconic acid;

an ethylenically-unsaturated monomer having a dicarboxylic functional group in acid or salt form and selected from the group consisting of itaconic acid, maleic acid, fumaric acid, mesaconic acid, citraconic acid, and maleic anhydride;

an ethylenically-unsaturated monomer having a sulfonic functional group in acid or salt form and selected from the group consisting of acrylamido-2-methyl-2-propane-sulfonic acid, sodium methallylsulfonate, sulfonic vinyl acid, and sulfonic styrene acid;

an ethylenically-unsaturated monomer having a phosphoric functional group in acid or salt form and selected from the group consisting of phosphoric vinyl acid, ethylene glycol methacrylate phosphate, propylene glycol methacrylate phosphate, ethylene glycol acrylate phosphate, propylene glycol acrylate phosphate, and ethoxylates thereof;

an ethylenically-unsaturated monomer of phosphonic vinyl acid having a phosphonic functional group in acid or salt form; and mixtures thereof; and b) 5-95 wt. % of at least one ethylenically-unsaturated oxyalkylated monomer terminated by a hydrophobic chain, represented by the following general formula (I):

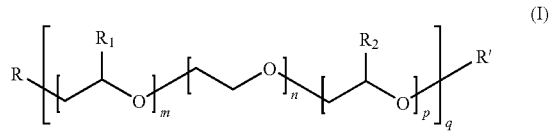

wherein:
m and p represent a number of alkylene oxide units less than or equal to 100, n represents a number of ethylene oxide units less than or equal to 100, and q is a number at least equal to 1, with $0 \leq q(n+m+p) \leq 100$, $R_1$ represents a hydrogen atom, a methyl radical or an ethyl radical, $R_2$ represents a hydrogen atom, a methyl radical or an ethyl radical, R represents a polymerizable unsaturated radical selected from the group consisting of acrylic acid, methacrylic acid, maleic acid, itaconic acid, crotonic acid, an ester of vinylphthalic acid, an acrylurethane, a methacrylurethane, an α,α'-dimethyl-m-isopropenyl-benzylurethane, and an allylurethane, and R' represents a hydrophobic radical which is a branched alkyl, alkylaryl, arylalkyl, or aryl group having 16 to 20 carbon atoms with two branches having at least 6 carbon atoms, or mixtures of these radicals.

4. The method according to claim 1, wherein said water-soluble copolymer is obtained by radical polymerization methods in a solution, in a direct or inverse emulsion, in a suspension or precipitation in solvents, in the presence of catalytic systems and transfer agents, or by controlled radical polymerization methods.

5. The method according to claim 1, wherein said water-soluble copolymer, obtained in an acidic and potentially distilled form, is fully or partially neutralized by one or more neutralization agents having a monovalent or polyvalent function, chosen from the group made up of alkaline cations selected from the group consisting of sodium, potassium, and ammonium, or chosen from among the group made up of primary, secondary, or tertiary aliphatic and/or cyclical amines selected from the group consisting of stearylamine, ethanolamines, mono- and diethylamine, cyclohexylamine, and methylcyclohexylamine; or chosen from the group made up of divalent alkaline-earth cations selected from the group consisting of magnesia, calcium, and zinc; or chosen from the group made up of trivalent cations.

6. The method according to claim 1, wherein the copolymer resulting from the copolymerization reaction, before or after the total or partial neutralization, is treated and separated into multiple phases, in accordance with static or dynamic methods, by one or more polar solvents preferentially belonging to the group consisting of water, methanol, ethanol, propanol, isopropanol, butanols, acetone, tetrahydrofurane, and mixtures thereof.

7. The method according to claim 1, wherein it uses a quantity of said water-soluble copolymer between 0.1% and 3% by dry weight compared to the total weight of the mineral materials.

8. The method according to claim 1, wherein the aqueous dispersion or suspension of mineral materials contains at least 10% by dry weight of mineral materials, in relation to its total weight.

9. The method according to claim 1, wherein the mineral material is selected from the group consisting of natural or synthetic calcium carbonate, dolomites, limestone, kaolin, talc, gypsum, lime, magnesia, titanium dioxide, satin white, aluminum trioxide, aluminum trihydroxide, silicas, mica, mixtures thereof, and co-structures thereof.

10. The method according to claim 1, wherein R' is a hydrophobic 2-hexyl-1-decanyl radical.

11. The method according to claim 1, wherein R' is a hydrophobic 2-octyl-1-dodecanyl radical.

12. The method according to claim 1, wherein the agent is obtained by grinding the mineral material in an aqueous medium in the presence of the water-soluble copolymer.

13. The method according to claim 1, wherein the agent is obtained by dispersing the mineral material in an aqueous medium in the presence of the water-soluble copolymer.

14. The method according to claim 1, wherein the agent is obtained by grinding and dispersing the mineral material in an aqueous medium in the presence of the water-soluble copolymer.

* * * * *